United States Patent
Kinjo

(10) Patent No.: US 8,022,936 B2
(45) Date of Patent: Sep. 20, 2011

(54) IMAGE DISPLAY APPARATUS AND IMAGE DISPLAY METHOD

(75) Inventor: Naoto Kinjo, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1060 days.

(21) Appl. No.: 11/779,695

(22) Filed: Jul. 18, 2007

(65) Prior Publication Data

US 2007/0268271 A1 Nov. 22, 2007

Related U.S. Application Data

(62) Division of application No. 09/836,287, filed on Apr. 18, 2001, now Pat. No. 7,262,763.

(30) Foreign Application Priority Data

Apr. 18, 2000 (JP) .................................. 2000-116375

(51) Int. Cl.
*G06F 3/041* (2006.01)
*G09G 5/00* (2006.01)

(52) U.S. Cl. ........................................ 345/173; 345/1.1

(58) Field of Classification Search ............ 345/84–107, 345/156–178, 1.1

See application file for complete search history.

(56) References Cited

U.S. PATENT DOCUMENTS

| 5,534,888 A | 7/1996 | Lebby et al. |
| 6,061,179 A | 5/2000 | Inoguchi et al. |
| 6,064,384 A | 5/2000 | Ho |
| 6,222,513 B1 | 4/2001 | Howard et al. |

FOREIGN PATENT DOCUMENTS

| JP | 04184823 | 7/1992 |
| JP | 04-355786 | 12/1992 |
| JP | 06059646 | 3/1994 |
| JP | 09330199 | 12/1997 |
| JP | 11-316397 | 11/1999 |
| JP | 2000075267 | 3/2000 |

OTHER PUBLICATIONS

Partial Translation of ASCII, vol. 24 #2, pp. 220-225, Feb. 2000.
Partial Translation of ASCII, vol. 24 #13, pp. 242-247, Mar. 2000.

*Primary Examiner* — Srilakshmi K Kumar
(74) *Attorney, Agent, or Firm* — Sughrue Mion, PLLC

(57) ABSTRACT

The image display apparatus includes an image data acquiring section for acquiring image data, an image display section having a plurality of substantially sheet-like image display mediums bundled and integrated for displaying images by using the obtained image data, an image display mode setting device for setting an image display mode in displaying an image on an image display screen of each of the plurality of image display mediums and an image display adjusting section for adjusting a display image according to the set image display. The image display method bundles and integrates a plurality of substantially sheet-like image display mediums for displaying images by using image data and sets an image display mode indicative of a display mode of an image on each of the image display mediums. The apparatus and method make it possible to comfortably appreciate the digital images with ease.

39 Claims, 6 Drawing Sheets

IMAGE DISPLAY APPARATUS AND IMAGE DISPLAY METHOD

This is a divisional of application Ser. No. 09/836,287 filed Apr. 18, 2001. The entire disclosure of the prior application, application Ser. No. 09/836,287 is hereby incorporated by reference.

BACKGROUND OF THE INVENTION

The present invention relates to an image display apparatus with an image display section having a plurality of substantially sheet-like image display mediums bundled up and an image display method using the image display apparatus, and more particularly to an image display apparatus and an image display method in which an electric paper sheet (electronic paper) is applied to the image display mediums.

At present, the diffusion of a personal computer, a digital still camera, a digital video camera and so on enables a large number of photographed images to be comfortably reproduced by an image display apparatus through the personal computer. For example, software of an electronic album is executed on the personal computer, and the image photographed by the digital camera is taken in and then displayed on an image display apparatus so as to be appreciated. Also, a moving picture photographed by the digital video camera is reproduced by exclusive software so as to be enjoyed.

Also, an image display apparatus only for displaying and appreciating a digital image photographed by a digital camera or the like is put on the market. For example, there is a digital photo frame made by Sony Corporation. The photographed image can be appreciated by using the exclusive device in such a manner as to turn over the leaves of a conventional paper album.

However, in the case where the software of the electronic album is executed on the personal computer, the size of a display image depends on the size of the image display apparatus used for the computer, and the number of images to be displayed simultaneously is also limited. Therefore, even if a large number of images are displayed, the image size must be made small, and it is difficult to appreciate the image in detail. Also, the operation of the computer in image display is also complicated.

Also, even in the exclusive image display apparatus for displaying and appreciating the digital image, in the case where the image is appreciated with a size of a certain degree or more, the number of images displayed at the same time is limited, and in the case where the image is displayed in the form of a slide show, a waiting period of time for changing over the image display is lengthened, which makes a person appreciating the image displeased. Thus, it is impossible to enjoy the image with ease without waiting for the change-over of the image display as in the conventional paper album.

Incidentally, Japanese Patent Application Laid-open No. Hei 11-316397 discloses a technique in which an electric paper sheet is applied to an electronic display. On the other hand, an article about the electric paper sheet (electronic paper) is disclosed in ASCII, February edition of 2000, pp. 220 to 225, and March edition of 2000, pp. 242 to 247.

According to the above publication and the above article, uncountable very small spheres that are painted with white and black half by half freely float with an oil fluid in a gap between two plastic sheets, and when an electric field is applied to the spheres from the external of the plastic sheets, the spheres are rotated and fixed, and in this situation, the white and black surfaces are directed to the surface of the plastic sheets by the rotation of the spheres so that the patterns and characters of white and black can float up, and it is noted the above principle can be applied to a color image.

Also, according to the above publication and article, transparent microcapsules each having a diameter of about 1/10 mm in the interior of which a large number of white spheres float in a blue liquid are two-dimensionally covered on a sheet, and an electric field is applied to the sheet from both surfaces thereof, to thereby move the white spheres within the microcapsules in one direction by the Coulomb force. As a result, the color of sheet on a portion of the microcapsules whose white spheres have been moved in one direction is changed from blue to white. The color image can be reproduced on the basis of the above principle.

The above-mentioned electronic paper has such advantages that because an image displayed once by application of an electric field is retained without disappearing until a succeeding electric field is applied, the power consumption is reduced as compared with the conventional liquid crystal display, and that the electronic paper has no visibility angle dependency that extremely changes the contrast of the image in accordance with a viewing direction unlike the liquid crystal display, although it has not been put in practical use yet.

Further, a film liquid crystal using a ferroelectric liquid crystal has been developed as electronic paper, although it also has not been put in practical use yet.

SUMMARY OF THE INVENTION

The present invention has been made to solve the above problems when displaying a plurality of digital images for enjoying and appreciating the images, and therefore an object of the present invention is to provide an image display apparatus and an image display method which make it possible to comfortably appreciate the digital images with ease and without reducing the image size by utilizing the above-mentioned various electric paper sheets (electronic papers) as in the conventional paper album.

In order to attain the object described above, the present invention provides an image display apparatus, comprising: an image data acquiring section for acquiring image data; an image display section having a plurality of substantially sheet-like image display mediums bundled and integrated for displaying images by using the image data obtained by the image data acquiring section; an image display mode setting device for setting an image display mode in displaying an image on an image display screen of each of the plurality of image display mediums of the image display section; and an image display adjusting section for adjusting a display image according to the image display mode set by the image display mode setting device.

Preferably, the image display mode setting device sets the image display mode by conducting at least one of a designation of the image display screen for image display of one image display medium from the plurality of the image display mediums, a designation of an image display position on the designated image display screen, a designation of a size of the display image, a designation of a direction of arranging the display image, a designation of a process of inverting the display image, a designation of a configuration of an outer frame of the display image, a designation of displaying a template image, a designation of compositing the template image with the display image and a designation of inputting a write comment.

Preferably, the image display mode setting device includes a transparent input element provided on the image display screen of the image display medium and sets the image display under employment of the transparent input element.

Preferably, the image display adjusting section arranges and adjusts a plurality of images onto the plurality of the image display mediums according to page category information assigned to the plurality of the image display mediums.

It is preferable that the image display apparatus further comprises a data communication device that communicates with an external device or via a communication network so as to transmit the image data.

Preferably, the image display adjusting section adjusts a display output of the display image according to a location environments.

It is also preferable that the image display apparatus further comprises a memory for storing the image data or voice data annexed to the image display screen; and an image input unit for inputting the image data or the voice data annexed to the image display screen, or a voice output unit for reproducing and outputting the voice data when having in the memory the image data or the voice data annexed to the image display screen.

It is further preferable that the image display apparatus further comprises a lens sheet provided on the image display screen of the image display medium.

Preferably, the lens sheet is a lenticular lens sheet or a compound eye lens sheet.

The present invention provides an image display method, comprising steps of: bundling and integrating a plurality of substantially sheet-like image display mediums for displaying images by using image data; and setting an image display mode indicative of a display mode of an image on each of the image display mediums.

Preferably, the image display mode is set by conducting at least one of a designation of the image display screen for image display of one image display medium from the plurality of the image display mediums, a designation of an image display position on the designated image display screen, a designation of a size of the display image, a designation of a direction of arranging the display image, a designation of a process of inverting the display image, a designation of a configuration of an outer frame of the display image, a designation of displaying a template image, a designation of compositing the template image and a designation of inputting a write comment.

Preferably, the image display mode is set by arranging and adjusting a plurality of images onto the plurality of the image display mediums according to page category information assigned to the plurality of the image display mediums.

DETAILED DESCRIPTION OF THE PREFERRED EMBODIMENTS

The image display apparatus according to the present invention will be described in detail below with reference to the preferred embodiments shown in accompanying drawings.

Figure 1:
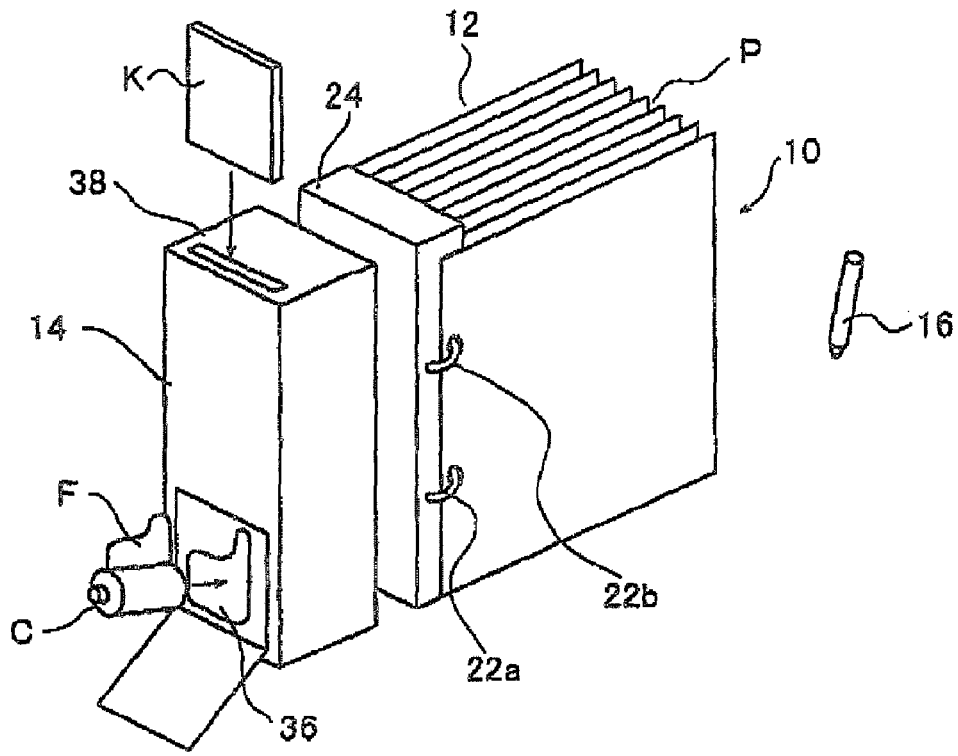
FIG. 1 is a perspective view showing the outline of the electronic album which is an embodiment of the image display apparatus of the present invention.

The perspective view in FIG. 1 schematically shows an electronic album 10 which is an embodiment of the image display apparatus of the invention.

The electronic album 10 shown in FIG. 1 is directed to an image display apparatus that acquires digital image data (hereinafter referred to simply as "image data") to display a digital image on an electronic paper P which is a substantially sheet-shaped image display medium. The electronic album 10 includes an image display section 12 having a plurality of substantially sheet-shaped electronic papers P that can freely write and erase the digital image bundled and integrated; an image data supply section 14 that supplies the image data for displaying the digital data to the image display section 12; and an input touch pen 16 for setting the display mode of a display image which is displayed on the electronic papers P.

The image display section 12 is structured as an image display section in which a plurality of substantially sheet-shaped electronic papers P are bundled by binding fittings 22a and 22b extending from a back cover 24 so as to be bound as in a paper album, and images are displayed on the respective electronic papers P. The image data supply section 14 and the respective electronic papers P are electrically connected to each other by wirings extending from the upper portion of the back cover 24.

As described above, the electronic paper P is directed to the electric paper sheet disclosed in Japanese Patent Application Laid-open No. Hei 11-316397, the electronic paper disclosed in ASCII, February edition of 2000, pp. 220 to 225 and March edition of 2000, pp. 242 to 247. The electronic paper P is also directed to a reflection image display medium which is a substantially sheet-shaped film liquid crystal using ferroelectric liquid crystal from which an image can be viewed due to the reflection of an external light as in a so-called printed substance. It is needless to say that the electronic paper P may be a transmission image display medium from which a light emitted from a light source passes through color filters and is then viewed as an image as in a TFT liquid crystal display. Only one surface side of the electronic paper of the above type is used as a display medium, but both surfaces can be used as the display medium if the electronic paper P is used in a state where the electronic paper is used in a folded state.

Also, in accordance with the invention, an electronic paper both surfaces of which function as the display medium may be used.

In this example, a transparent pressure sensitive sheet having transparent pressure sensitive elements arranged two-dimensionally is stuck on the surface of the display medium of the electronic paper P so as to cover the entire surface of the electronic paper P. When a desired position of the electronic paper P is pressurized by using the input touch pen 16, a signal indicative of a pressurized position is transmitted to an image display adjusting section 34 of the connected data supply section 14 so that a desired indication or designation can be conducted in accordance with the pressurized position as will be described later.

The image data supply section 14 is structured by a digital image supply source which is detachably mounted on the back cover section 24, and supplies the image data for displaying the image to the respective electronic papers P of the image display section 12.

Figure 2:
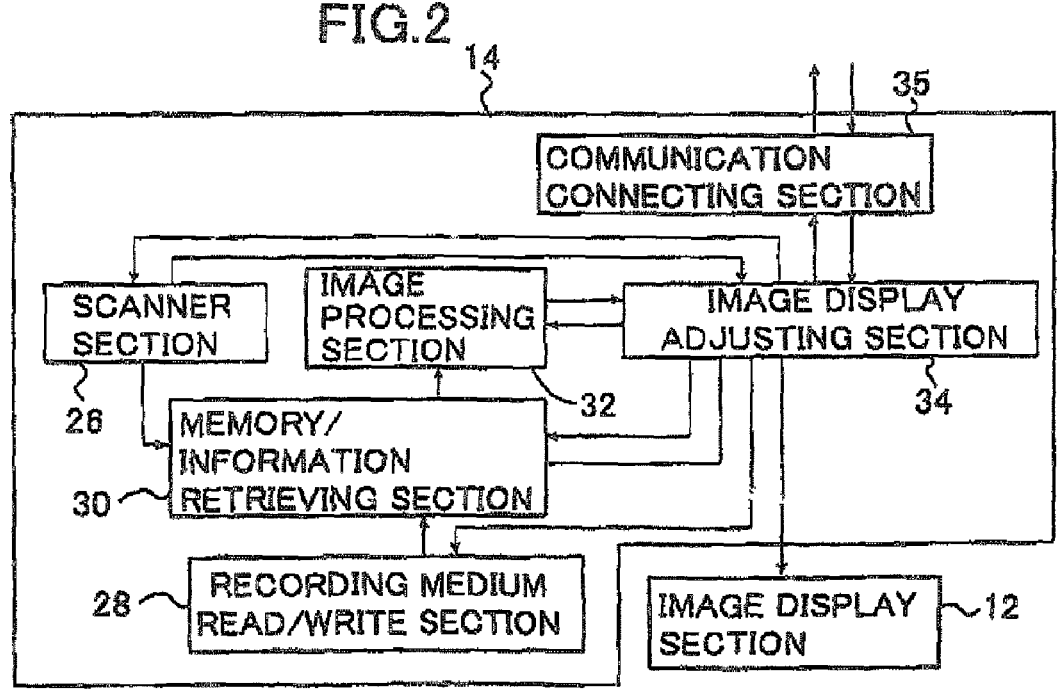
FIG. 2 is a block diagram showing the structure of an embodiment of the electronic album shown in FIG. 1.

As shown in FIG. 2, the image data supply section 14 is made up of a transparent scanner section 26 that reads an image from an APS (advanced photo system) film which has photographed an image by using a normal camera and was then subjected to a developing process; a recording medium read/write section 28 for reading the image data from a recording medium such as a PC card or a flash memory card; a memory/information retrieving section 30 that temporarily records and retains image data and such as information annexed to the image data and retrieves edit data related to a past image display mode recorded on the basis of that information; and an image processing section 32 that subjects the image data read by the scanner section 26 to correction processing such as lightness correction or chromaticity correction as well as an automatic top/bottom recognizing processing that automatically detects the top/bottom direction of photographing by extracting a photographed subject or the like; and an image display adjusting section 34 that adjusts the image display of the processed image data in accordance with the set image display mode. The image data supply section 14 is also made up of a communication connecting section 35 that is connected to another electronic album or a computer through communication, and a control section not shown which controls and manages the operations of the scanner section 26, the recording medium read/write section 28, the memory/information retrieving section 30, the image processing section 32, the image display adjusting section 34 and the communication connecting section 35. Also, the memory/information retrieving section 30, the image processing section 32, the image display adjusting section 34 and communication connecting portion 35 are made up of circuits disposed on a substrate.

The input touch pen 16 is directed to a pointing device for setting the display mode of a display image displayed on the electronic paper P and forms the image display mode setting device of the present invention in association with the transparent pressure sensitive sheet having the transparent pressure sensitive elements which are two-dimensionally disposed on the surface of the display medium of the electronic paper P.

A desired position of the electronic paper P is pressurized by using the input touch pen 16, and a signal indicative of the pressurized position is transmitted to the image display adjusting section 34 of the connected data supply section 14 so as to conduct a desired indication or designation.

The present invention pertains to an input method that conducts a desired designation by using a pressure type input touch pen 16 and a transparent pressure sensitive element. However, the present invention is not limited to this method, but may be an input method using a pointing device through the electric system or the optical system.

Figure 3:
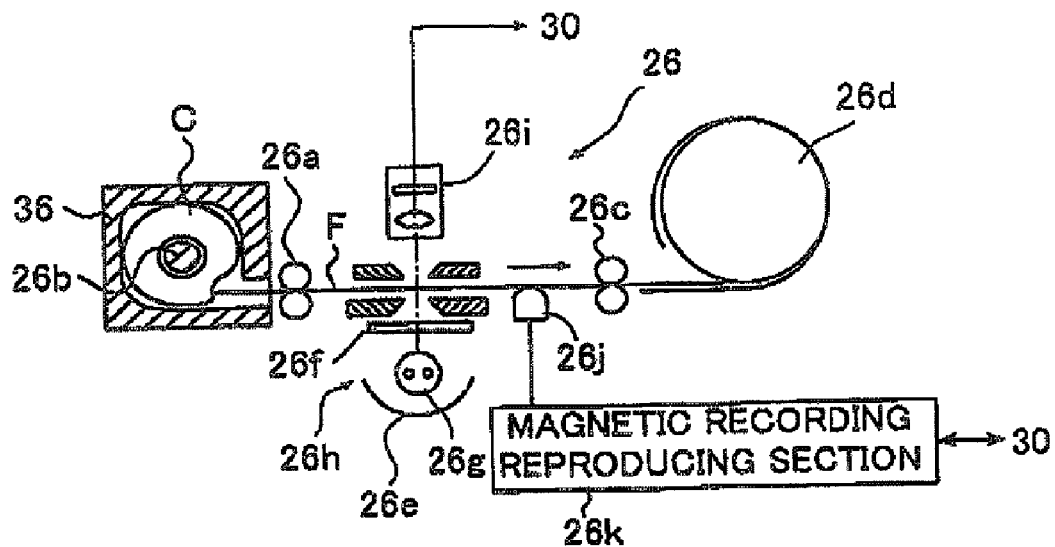
FIG. 3 is a structural diagram showing the structure of an embodiment of the scanner section shown in FIG. 2.

As shown in FIG. 3, the scanner section 26 is structured by a small-sized scanner device that sends out the film F of a cartridge C loaded in a cartridge loading section 36 disposed in the image data supply section 14 by rotating a spool rotating shaft 26b, and then reads by an image read section 26i a transmission light obtained by transmitting a projected light toward the conveyed film F from a light source section 26h having a reflector 26e, a diffusion plate 26f and a light source 26g in a conveying path along which the film F is conveyed toward a film receiving section 26d by a pair of guide rollers 26a and a pair of film feed rollers 26c which are connected to a film feed motor. The scanner section 26 comprises an image data acquiring section according to the present invention. The scanner section 26 includes an amplifier not shown which amplifies the obtained read data and conducts A/D conversion, an A/D converter and a data Processing section that subjects the read data to a predetermined processing into image data, and the image data is obtained from the read data, the amplifier, the A/D converter and the data processing section, and transmits the obtained image data to the memory/information retrieving section 30.

Also, the scanner section 26 acquires a cartridge No. and photographing information recorded in a transparent magnetic recording layer provided in correspondence with a photographing frame of the film F as well as film/image information as to the image display mode is adjusted or not which will be described later through a magnetic head 26j and a magnetic recording reproducing section 26k. The scanner section 26 transmits the above read information on the cartridge No. or the like to the memory/information retrieving section 30.

The recording medium read/write section 28 reads the image data and the edit data as to the image display mode of the image which will be described later from the card type recording medium K such as a PC card or a flash memory card, and can write the image data and the edit data into the card type recording medium K. The recording medium read/write section 28 corresponds to the image data acquiring section of the present invention and includes a card slot 38 on an upper portion of the image data supply section 14 into which the card type recording medium K can be inserted. The recording medium read/write section 28 transmits the obtained read image data to the memory/information retrieving section 30.

The recording medium read/write section 28 according to this embodiment is so designed as to read the card type recording medium K such as a PC card or a flash memory card, but the present invention is not limited to the card type recording medium, but may use any type if it can read known recording media, for example, a stick-shaped IC recording media such as IC recording media "memory stick" made by SONY Corporation.

The memory/information retrieving section 30 includes a frame memory that records and retains a plurality of image data read from the film F and a plurality of image data transmitted from the recording medium read/write section 28, and a memory that records and retains the film/image information and the edit data transmitted from the scanner section 26 and the recording medium read/write section 28 as well as existing edit data which has been set in the past for each of the cartridge Nos. and each of the file names.

The memory/information retrieving section 30 records and retains the film/image information transmitted from the scanner section 26, and finds out the edit data as to the past image display mode which is managed and saved by the cartridge No. recorded and retained in the memory with reference to the cartridge No. in the case where the information that conducted the adjustment of the image display mode is obtained from the film/image information. In the case where the edit data is not detected, the memory/information retrieving section 30 reads predetermined default edit data.

In the case where the edit data is detected, the image data recorded and retained in the memory is transmitted to the image processing section 32, and the edit data and the film/image information is transmitted to the image display adjusting section 34. The image data transmitted to the image processing section 32 is subjected to image processing and finally transmitted to the image display adjusting section 34.

In the case where the edit data is not detected, the image data is transmitted to the image processing section 32, and the default edit data and the film/image information are transmitted to the image display adjusting section 34. The image data transmitted to the image processing section 32 is subjected to image processing and Thereafter finally transmitted to the image display adjusting section 34.

Even in the case where the above edit data is detected from the memory, in order to edit and adjust the image display mode in accordance with a designation from the input touch pen 16, the default edit data may be transmitted to the image display adjusting section 34.

Also, the memory/information retrieving section 30 records and retains the edit data as to the film name and the image display mode transmitted from the recording medium record/write section 28, and transmits the edit data together with the image data to the image display adjusting section 34 in the case of obtaining the edit data as to the image display mode. Also, the memory/information retrieve section 30 may detect the edit data as to the past image display mode managed and saved in the file name and may transmit the edit data to the image display adjusting section 34. The memory/information retrieving section 30 reads the default edit data and transmits the data to the image display adjusting section 34 in the case where the edit data is not obtained.

Even in the case where the above edit data is detected from the memory, in order to edit and adjust the image display mode in accordance with a designation from the input touch pen 16, the memory/information retrieving section 30 may transmit the default edit data to the image display adjusting section 34.

The image processing section 32 is a section that conducts image processing on the image data obtained by the scanner section 26, and conducts known processing as the image processing. For example, the image processing section 32 conducts a gray balance adjustment using an LUT (lockup table), a gradation correction, a density (brightness) adjustment, a photograph light source species correction due to a matrix (MTX), an image saturation adjustment (color adjustment), an electron variable power processing, a grain shape suppressing processing, a sharpness emphasizing processing, a dodging processing (density dynamic range compression/expansion) if occasion demands. Also, the image processing section 32 conducts a principal subject extracting processing that extracts a principal subject, for example, a person from the image data, and an automatic top/bottom recognizing processing of the photographed image by using the results of extracting the principal subject if occasion demands.

The image display adjusting section 34 is a section that adjusts the image display on the basis of the edit data related to the image display mode or the default edit data transmitted from the memory/information retrieving section 30.

Figure 4:
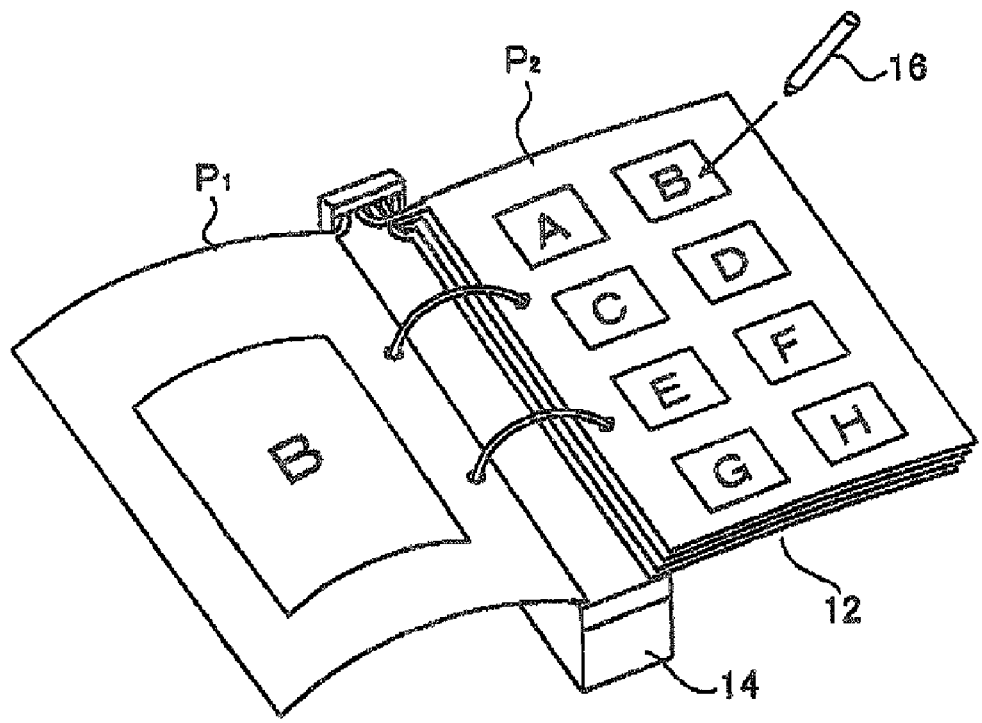
FIG. 4 is a perspective view showing an embodiment of image display modes in the electronic album shown in FIG. 1.

In the case where the default edit data is transmitted from the memory/information retrieving section 30, as shown in FIG. 4, images are displayed in a state where a plurality of images are arranged on an electronic paper $P_2$ of a right page of opened pages longitudinally and laterally in a regular manner with a given size. Also, the image designated by designating a position within the display image by using the input touch pen 16 is enlarged and displayed at a given position of the electronic paper $P_1$ of the left page. The enlarged display of the image on the electronic paper $P_1$ is conducted by transferring the image data of the designated display image to the image processing section 32 from the image display adjusting section 34 for the mean time, returning the image data subjected to the given electron variable power processing to the image display adjusting section 34, and transmitting the image data to the image display section 12. In this embodiment, the image is enlarged and display in one page, but the image may be enlarged and displayed over a plurality of pages.

In this example, the default edit data is directed to edit data where values at the respective items shown in Table 1 which will be described later are predetermined, and for example, "display position" is predetermined as given position coordinates of the electronic paper $P_3$ shown in FIG. 5, "frame configuration" is predetermined as "a rectangular frame", "enlargement/reduction ratio" is predetermined as "100%", "rotation" is predetermined as "0°", "inversion" is predetermined as "N", and "special display" is predetermined as "N".

The image display adjusting section 34 can edit and adjust the image display mode based on the default edit data thus displayed by using the input touch pen 16.

In the case of editing and adjusting the image display mode, the predetermined position is designated by the input touch pen 16 to enter an edit mode.

Figure 5:
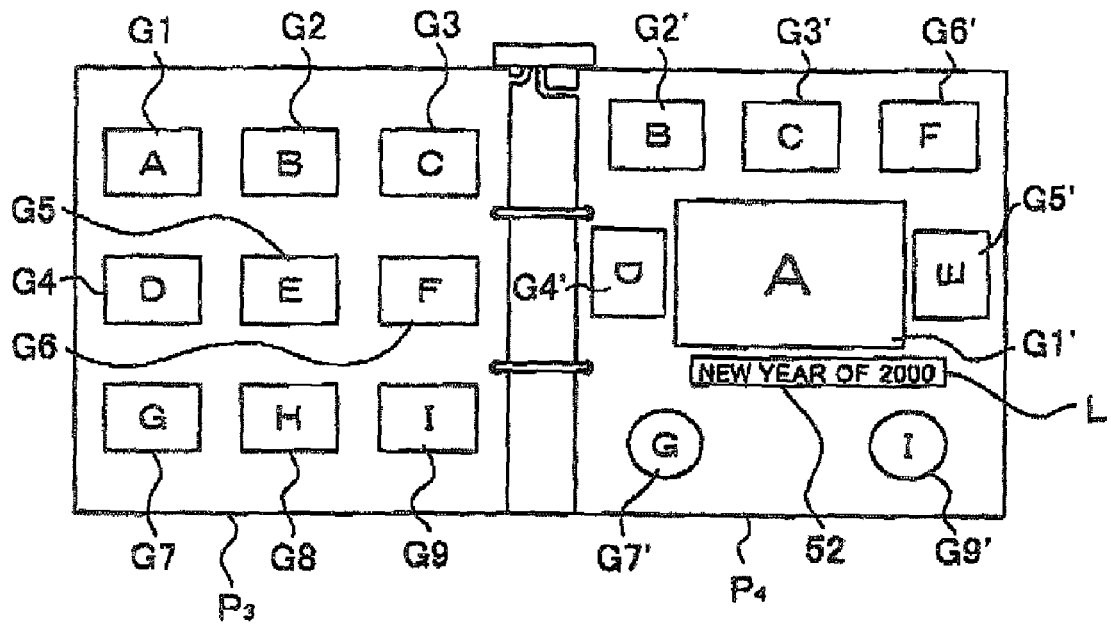
FIG. 5 is a plan view showing another embodiment of image display modes in the electronic album shown in FIG. 1.

FIG. 5 shows the pages of the electronic paper $P_3$ indicative of a frame display page that frame-displays the image data at a given position within a given frame (for example, a content page that displays a thumb nail image) and the electronic paper $P_4$, and the electronic paper $P_4$ shows an example of the edited image display mode.

The electronic paper $P_3$ of the frame display page displays images G1 to G9, and the electronic paper $P_4$ displays images G1', G2', G3', G4', G5', G6', G7' and G9' corresponding to the images G1, G2, G3, G4, G5, G6, G7 and G9 and an image display mode where G9' is arranged at a desired position. In this image display mode, the desired image displayed on the electronic paper $P_3$ is designated by using the input touch pen 16, "copy" is selected from processing work designation items not shown, and the desired position of the electronic paper $P_4$ is designated by using the input touch pen 16, thereby being capable of arranging the desired image at the desired position. The image arranged at the desired position is designated by using the input touch pen 16 through the above operation, and "enlargement/reduction" is selected from the processing work designation items not shown, thereby being capable of enlarging the image into the image G1'. The enlargement/reduction processing is conducted by transferring the image data of the designated display image to the image processing section 32 from the image display adjusting section 34 once, returning the image data subjected to the given electron variable power processing to the image display adjusting section 34, and transmitting the image data to the image display section 12.

Also, it is possible that the image disposed at the desired position is designated by using the input touch pen 16, "outer frame configuration" is selected from the processing work designation items, and a specific configuration, for example, an outer frame configuration such as "triangle configuration", "hexagonal configuration" or "circular configuration" may be designated from sub-items. In FIG. 5, the images G7' and G9' designate the circular configurations.

Also, a desired processing is designated from the processing work designation items by using the input touch pen 16 so that the image disposed at the desired position can be rotated at a desired angle, for example, clockwise or counterclockwise by 90 degrees or 180 degrees (rotation). In FIG. 5, the image G4 is disposed at a desired position and rotated clockwise by 90 degrees to obtain the image G4', and the image G5' is disposed at a desired position and rotates counterclockwise by 90 degrees to obtain the image G5'. Also, the right/left inverting processing that inverts the right hand part and the left hand part of an image can be conducted (inversion).

In addition, the rotation of the image can be manually set by the input touch pen 16. Also, a principal subject is extracted in the image processing section 32 by using a known principal subject extracting technique in advance, and the top/bottom direction of the image is specified. The position of the electronic album, for example, the vertical direction is specified by using a known position detecting technique using a position detection sensor disposed in the electronic album 10, to thereby automatically set the vertical arrangement of the display image so as to be suited for the position of the specified electronic album 10. Also, the extraction of the principal subject and the specification of the image top/bottom direction may be conducted by a personal computer 50 connected to the electronic album 10 as will be described later, and in this case, the specified image top/bottom direction is transmitted to the electronic album 10.

Also, "write" is selected from the processing work designation items by using the input touch pen 16, and a write comment L such as letters "New Year of 2000" is designated by using the input touch pen 16 so as to be written. The above image editing is not limited to the above processing, but may be conducted by another processing if it is a known processing that can realize the image editing by computer image processing touch software. For example, as a template image registered in advance, for example, as an image background, a decoration or pattern which is registered in advance may be displayed together with an image, or the decoration or the pattern may be composited with the display image and displayed. In addition, the template image registered may be appropriately exchanged and updated.

The image display mode thus obtained can be set to the respective pages of plural electronic papers P with a feeling that the image prints are arranged as in conventional paper albums. At the same time, the edit data shown in the following Table 1 is automatically collected and prepared.

In this example, "processing No." is directed to an identification No. of an adjusting processing in the image display adjusting section 34, "image data" is directed to the image data which is subjected to adjustment, "display page" is directed to page No. of the electronic paper P of the image display section 12, "display position" is directed to the center coordinate of the display image from a given reference position at the respective pages, "frame configuration" is directed to the outer frame configuration of the display image, "enlargement/reduction ratio" is directed to the image enlargement/reduction ratio, "rotation" is directed to the image rotation angle (in this embodiment, counterclockwise rotation is forward rotation), "inversion" is directed to the presence/absence of the inversion processing ("Y" or "N"), and "special processing" is directed to a special processing such as "moving processing" or "three-dimensional view mode display", respectively.

In addition, the following information related to the write comment in accordance with the display mode of an image area 52 is automatically added and prepared as the edit data.

TABLE 2

| Processing no. | Display page | Display position | Written contents |
| --- | --- | --- | --- |
| 1001 | 1 | $(x_{1001}, y_{1001})$ | New Year of 2000 |

In this example, "processing No." is directed to an identification No. of an adjusting processing in the image display adjusting section 34 described later, "display page" is directed to the page No. of the electronic paper P of the image display section 12, and "display position" is directed to the center coordinates (it may be the position where the writing started) of the write comment from a given reference position at the respective pages, respectively.

The above edit data is recorded and retained in the memory/information retrieving section 30 or recorded in the card type recording medium K once the edit mode is prepared, and therefore if the film cartridge C or the card type recording medium K is loaded or inserted at a given position of the image data supply section 14 next time, the edit data is obtained, and the image display mode determined by the edit data can be automatically reproduced by using the edit data.

In addition, in the case where the image data is read by the scanner section 26, the image display adjusting section 34

TABLE 1

| Processing no. | Image data | Display page | Display position | Frame configuration | Enlargement/reduction ratio | Rotation | Reverse rotation | Specific display |
| --- | --- | --- | --- | --- | --- | --- | --- | --- |
| 1 | G1 | 1 | $(x_1, y_1)$ | Rectangular configuration | 200% | 0° | N | N |
| 2 | G2 | 1 | $(x_2, y_2)$ | Rectangular configuration | 100% | 0° | N | N |
| 3 | G3 | 1 | $(x_3, y_3)$ | Rectangular configuration | 100% | 0° | N | N |
| 4 | G4 | 1 | $(x_4, y_4)$ | Rectangular configuration | 100% | −90° | N | N |
| 5 | G5 | 1 | $(x_5, y_5)$ | Rectangular configuration | 100% | +90° | N | N |
| 6 | G6 | 1 | $(x_6, y_6)$ | Rectangular configuration | 100% | 0° | N | N |
| 7 | G7 | 1 | $(x_7, y_7)$ | Circular configuration | 100% | 0° | N | N |
| 8 | G8 | 1 | $(x_9, y_9)$ | Circular configuration | 100% | | N | N | transfers the prepared edit data to the memory/information retrieving section 30. This is because in the memory/information retrieving section 30, the edit data is recorded and retained in the memory together with the cartridge No. obtained when reading the image in the scanner section 26. Also, the image display adjusting section 34 transmits the information related to the prepared edit data to the magnetic recording reproducing section 26*k* of the scanner section 26. This is in order to record the information that the image display mode is adjusted on the transparent magnetic recording layer of the film F.

Also, in the case of reading the image data from the card type recording medium K, the edit data is transmitted to the recording medium read/write section 28 so that the recording medium read/write section 28 writes the edit data in the card type recording medium K.

The image display adjusting section 34 can conduct a special processing such as the temporal image moving display or the three-dimensional view mode display in addition to the editing and adjustment of the display image.

For example, the temporal image moving display is the reproduction and display of a moving picture that moves with a given time in the case where a page that displays an image subjected to the temporal moving display is opened, as disclosed in Japanese Patent Application Laid-open No. Hei 10-261071. In this moving display, a desired image is designated by using the input touch pen 16, "moving display" is designated from the processing work designation items, a moving start position, a reached position at the moving end time and a passing position during the image movement are designated within the page at the time of starting the image, and the display times are inputted at the respective positions, to thereby prepare the edit data of the "moving display" processing.

Figure 6:
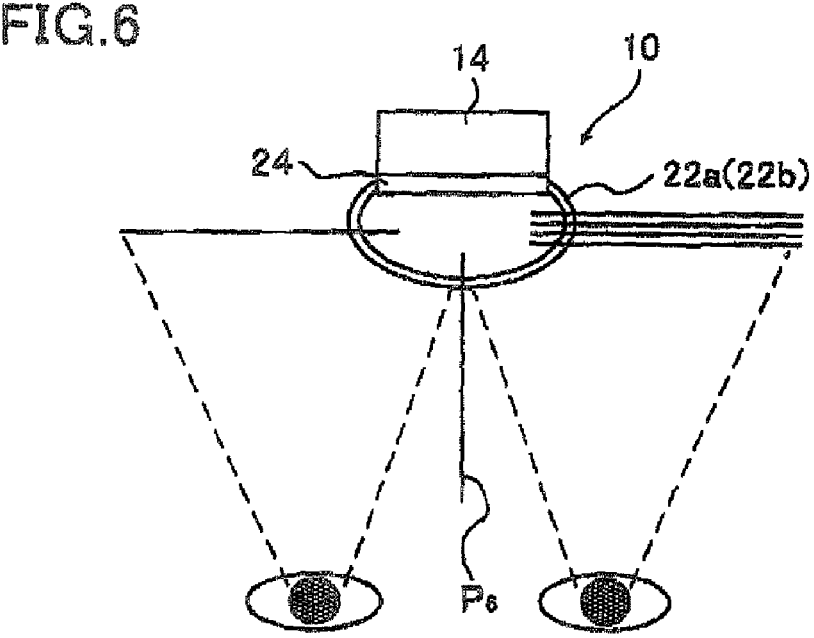
FIG. 6 is an explanatory diagram for explaining yet another embodiment of image display modes in the electronic album shown in FIG. 1.

The three-dimensional view mode display is directed to a display where a pair of images for right and left eyes which are photographed as a three-dimensional photograph are disposed at the right and left pages between which one sheet of electronic paper $P_6$ is interposed as shown in FIG. 6. In this display, "three-dimensional view display" is designated from the image processing work designation items by using the input touch pen 16, and the image which is three-dimensionally displayed is designated, and an image that is subjected to the three-dimensional view mode display and a page that is three-dimensionally displayed are designated, to thereby prepare the data related to the three-dimensional view mode display in the edit data. Also, designation may be made in such a manner by using the input touch pen 16 that pages on both sides of the electronic paper $P_6$ that partitions the sight lines of both of right and left eyes in FIG. 6 may be displayed in black or while over the entire surface. The three-dimensional view can be facilitated by displaying black or white.

Figure 7A:
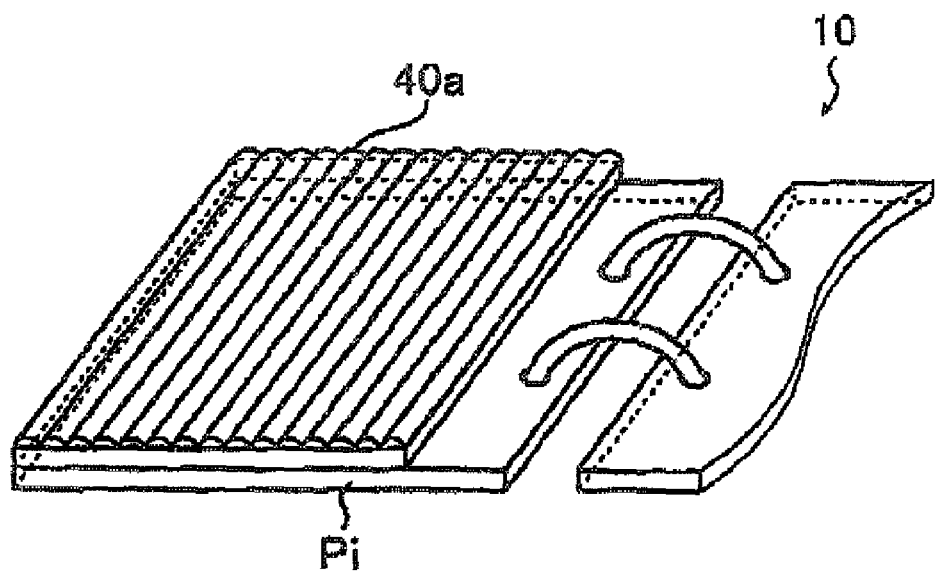
FIG. 7(a) is a schematical perspective view showing another embodiment of the electronic album shown in FIG. 1.
Figure 7B:
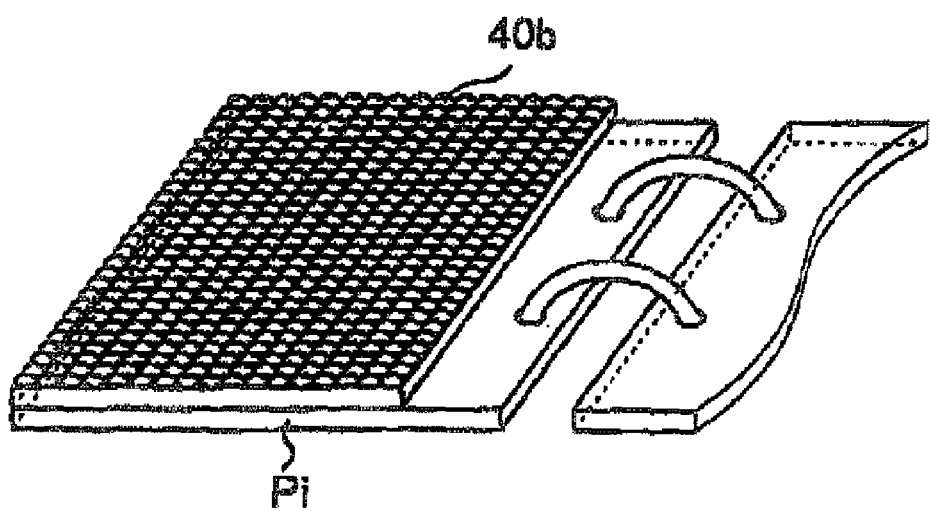
FIG. 7(b) is a schematical perspective view showing yet another embodiment of the electronic album shown in FIG. 1.

In order to make the three-dimensional view mode display more appropriate and of higher quality, any conventional stereophotography may be applied to the present invention. Thus, an electronic paper having a special lens sheet stuck on its image display screen may be provided as a page of the electronic album. As shown in FIG. 7(*a*) or 7(*b*), for example, a lenticular lens (semi-cylindrical lens) sheet 40*a* or a compound eye lens sheet 40*b* as the special lens sheet may be stuck on the image display screen of the electronic paper $P_1$ which constitutes one page of the electronic album 10. The special lens sheet is not limited to ones to be stuck on the image display screen of the electronic paper $P_1$ of the electronic album 10. The special lens sheet may be arranged at any suitable position in the image display screen of the electronic paper $P_1$ or fixed to the image display screen of the electronic paper $P_1$ in any other way than sticking, or may be detachable from the image display screen of the electronic paper $P_1$.

When an image is displayed on such a page that has a special lens sheet stuck thereon, image processing for the three-dimensional image display is performed depending on the type of the special lens sheet in question, namely the lenticular lens sheet 40*a*, the compound eye lens sheet 40*b*, or the like. In case of the lenticular lens sheet 40*a* shown in FIG. 7(*a*), for example, image processing is performed such that each of the image for the right eye and the image for the left eye which are shot from the directions different from each other is decomposed into a plurality of linear image components according to the size and pitch of the lenticular lens and the image components thus obtained are composed again to one image in such a manner that the components of the image for the right eye and the components of the image for the left eye are alternately arranged, then the resulted image is displayed. A three-dimensional image can be viewed by observing the image consisting of linear image components which is displayed as stated above through the lenticular lens sheet 40*a*.

The three-dimensional image is not limited to that of two visual point type as above. Three-dimensional images of multi visual point type shot from more than two visual points may be possible. For example, if the compound eye lens sheet 40*b* shown in FIG. 7(*b*) is used, image processing is performed such that many images shot from the various directions according to the size and pitch of the compound eye lens sheet 40*b* are decomposed and then composed again so that the image may be obtained to display on the image display screen that can be three-dimensionally viewed through the compound eye lens sheet 40*b*.

If it is intended to display one and the same image on the ordinary image display screen on which a special lens sheet is not stuck, the display control for the ordinary image display screen is performed. When displaying on the ordinary image display screen without the special lens sheet such as the lenticular lens sheet 40*a*, image processing may be performed such that one image as taken from the central visual point is obtained from two images for the right eye and for the left eye and then displayed or any one of the image for the right eye and the image for the left eye may be displayed, or the image particularly shot from the central visual point may be displayed.

In accordance with the present invention, the three-dimensional image to be displayed on the page consisting of the electronic paper $P_1$ of the electronic album 10 is not limited to the image re-composed on image processing. For example, a pair of linear images (for the lenticular lens sheet), one for the right eye and the other for the left eye, or the microimages obtained at various shooting angles slightly different from one another (for the compound eye lens sheet) may be shot as a three-dimensional photograph through the special lens sheet which is identical to the special lens sheet stuck on the image display screen of one electronic paper $P_1$, namely the lenticular lens sheet 40*a* or the compound eye lens sheet 40*b*, and then displayed. In this case also, the observer can view the displayed image as a three-dimensional image, when observing the image through the special lens sheet. It should be noted that the image display on one electronic paper $P_1$ is exactly determined in position according to the factors (including the size and the pitch) of individual lenses of the special lens sheet stuck on the electronic paper in question, namely the lenticular lens sheet 40*a* or the compound eye lens sheet 40*b*, for example.

The special lens sheet used in the present invention may be the lenticular lens sheet 40a or the compound eye lens sheet 40b, for example. Lenticular lenses to be used for a lenticular lens sheet may include, apart from a lenticular lens having a three-dimensional semi-cylindrical form, a plane distributed index lens whose refractive index is varied in one direction only. As for compound eye lens again, optical fibers of distributed index type may be used instead of a compound eye lens for the reproduction of three-dimensional images of IP (integral photography) mode, that consists of a large number of small lenses just like an eye of a dragonfly.

As is clear from the description above, the three-dimensional image display under employment of a special lens sheet is suitable for displaying images with depth information or computer graphic (CG) images.

Also, information indicative of the three-dimensional photographing is contained in the recording information of a transparent magnetic recording layer which reads the film F at the same time as when the scanner section 26 reads the film F, and in the case where the information is identified by the image display adjusting section 34, "three-dimensional view display" may be automatically set with respect to a pair of image data corresponding to that information. In this case, the designation of "display page" is inputted by the input touch pen 16.

Figure 8A:
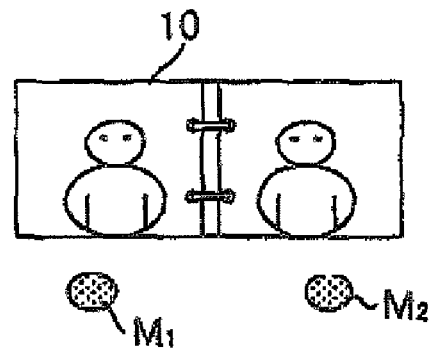
FIG. 8(a) is an explanatory diagram for explaining another embodiment of image display modes in the electronic album shown in FIG. 1.
Figure 8B:
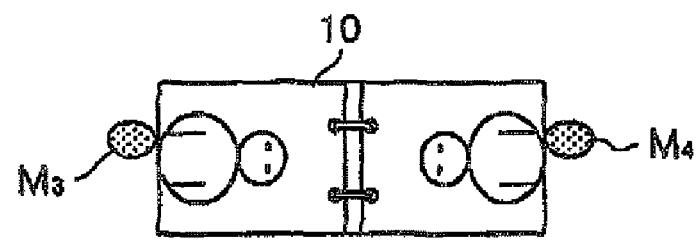
FIG. 8(b) is an explanatory diagram for explaining yet another embodiment of image display modes in the electronic album shown in FIG. 1.

In addition, there may be provided a function in which a micro photographing camera, for example, a CCD image pickup element is disposed in the electronic album 10, a person using the electronic album 10 is photographed by the photographing camera, and a known principal subject extracting operation is conducted to recognize the position of the person who uses the electronic album 15, thereby confirming a direction of the person view. For example, in FIG. 8(a), an image display mode may be applied in which the same image is displayed on both pages on both sides of the opened pages in the same direction in accordance with persons $M_1$ and $M_2$ who view the image from the same direction, depending on a case in which two persons view the image on the opposite sides with the electronic album interposed between them or a case in which those two persons view the image from the same side and the like. Also, in the case where two persons $M_3$ and $M_4$ who face each others as shown in FIG. 8(b) view the image, the image display mode may be made which displays the image in such a manner that the same image rotates by 180 degrees so that the vertical direction of the photographed image becomes identical from the respective persons. The edit data of this image display mode is dealt with as "plural image display", and the designation of the image which conducts "plural image display" and the designation of a display page are conducted by the input touch pen 16.

Figure 9A:
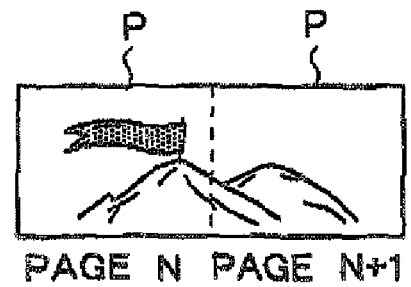
FIG. 9(a) is an explanatory diagram for explaining further embodiment of image display modes in the electronic album shown in FIG. 1.

Further, in accordance with the present invention, it is possible as a special display to display any one image through two pages of a double spread, page N and page N+1, for example, as shown in FIG. 9(a). It is even possible to display one image through three or more pages, exceeding two pages of a double spread. In such a case, it is preferred that one image is displayed on the binding portion bordering two pages of a double spread as well without discontinuation, as shown in FIG. 9(a). By the way, it is also possible to display the image on the portion other than the binding portion to leave the latter blank.

Figure 9B:
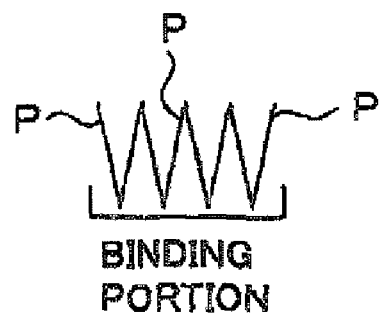
FIG. 9(b) is an explanatory diagram for explaining another embodiment of the structure of the electronic album shown in FIG. 1.

In accordance with the present invention, the image display section 12 is not limited to the structure shown in FIG. 1 in which a plurality of substantially sheet-shaped electronic papers P are bundled on their one side where the back cover 24 is arranged. As shown in FIG. 9(b), a plurality of substantially sheet-shaped electronic papers P may be sequentially connected in such a manner that one side of a first electronic paper P is connected with the other side of a second electronic paper F and so on and the electronic papers thus connected with one another into a bellows-like (accordion-folded) form may be bundled on their one side to form the image display section 12 of the electronic album 10 that has a plurality of pages. The electronic papers connected as stated above may be bundled as such on any of two sides where they are connected with one another.

Optionally, the binding unit for the image display section as above may be made detachable, thereby enabling to display an elongated image such as a panoramic image as required. Such a structure is particularly preferable when displaying an elongated image which can not be displayed in its entirety on two pages of a double spread as shown in FIG. 9(a), because it makes it possible to display an image through more than two pages as one continuous image.

In addition, an image category display can be conducted as a special display.

The image category display is directed to an image display mode in which page category information is assigned to the display page in advance, and the image is displayed in accordance with the page category information.

For example, photograph information classified to a photographed scene such as a person, flowers, an excursion or an athletic meeting, photographing date, etc., which is read by a magnetic head 26j of the scanner section 26, sent to the image display adjusting section 34 and identified, and recorded in the transparent magnetic recording layer of the film F at the time of photographing, is used as the image category information, and the image having the identical image category information in the page category information is displayed on a page assigned to the page category information. As a specific example of the page category information and the image category information, there are the scene categories such that $a_1$ to $a_2$ pages are "person" and $a_3$ to $a_4$ pages are "flower", the event categories such that $b_1$ to $b_2$ pages are "excursion", $b_3$ to $b_4$ pages are "athletic meeting", and person categories such that $c_1$ to $c_2$ pages are "Bill" and $C_3$ to $C_4$ pages are "George". In the case where the photographed image has no image category information, the "copy" processing is subjected to the page category information assigned in advance so that the page category information can be set as the image category information of the image. Also, in the case where an image is copied (duplicated) from another page category information by the "copy" processing, the image category information of the image is rewritten to the page category information applied to the page on which the copied (duplicated) image is displayed and automatically updated.

The above image display mode of the image category display is dealt with as "category display" in the special processing of the edit data and an image area to be categorized and displayed is designated by using the input touch pen 16, "category display" is designated from the processing work designation items, and the designation of "page category information" and the designation of "display page" are conducted to prepare the edit data.

In the case where the image is not put within the assigned page prepared in advance, the image display mode that successively updates the image display every given period of time may be applied, or the assigned page is automatically updated to automatically expand the number of pages so that the display page assigned to the page category information appearing subsequent to the page category information which does not fit within the predetermined page may be updated. This image display mode preferably designates any one of "time update display" and "page designation update display" when designating "category display" in advance.

Since the above-described edit data of the special display is formed as a part of the edit data prepared by the designation of the normal processing such as "copy" or "enlargement", once the edit data is prepared, recorded and retained in the memory/information retrieving section 30 or recorded in the card type recording medium K, the edit data of the special display is obtained by only loading or inserting the film cartridge C or the card type recording medium K at a predetermined position next time, and the image display mode of the special display determined by the edit data can be automatically reproduced.

In the case where the images are superimposed on each other by the editing or adjustment of the images, an image late in processing order may be displayed on an upper surface of the image display, or may be displayed on a lower surface, or the images of superimposed portions may be composited. The image adjusting section 34 is structured as described above.

Figure 10A:
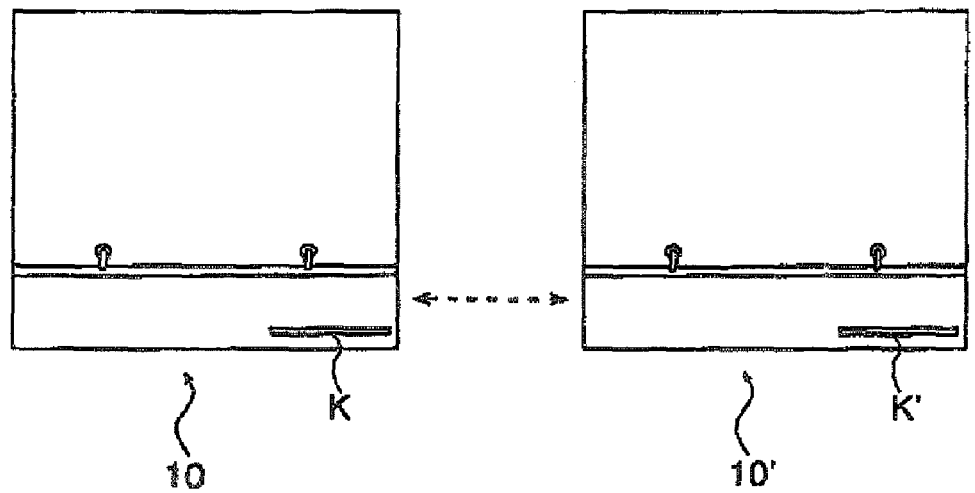
FIGS. 10(a) and 10(b) are explanatory diagrams for explaining communication modes of the electronic album shown in FIG. 1 respectively.

The communication connecting section 35 forms a data communication device that enables the communication connection with another electronic album, a computer, a communication network or the like, and includes known communication boards, for example, an SCSI board, an infrared ray communication board, an internet board or a modern. For example, as shown in FIG. 10(a), the electronic album 10 is communicably connected to another electronic album 10' through a communication cable or a radio such as infrared rays, and the image can be edited between the electronic album 10 and the electronic album 10'. For example, a copied portion of the display image of the electronic album 10 through the "copy" processing is designated to the electronic album 10', and the display image can be stuck onto a desired position of a desired page. In this case, not only an image unit but also a page unit and an area designation can be conducted by using the input touch pen 16.

In this situation, the image data of the image transferred may be recorded on the card type recording medium K' inserted into the electronic album 10'.

Figure 10B:
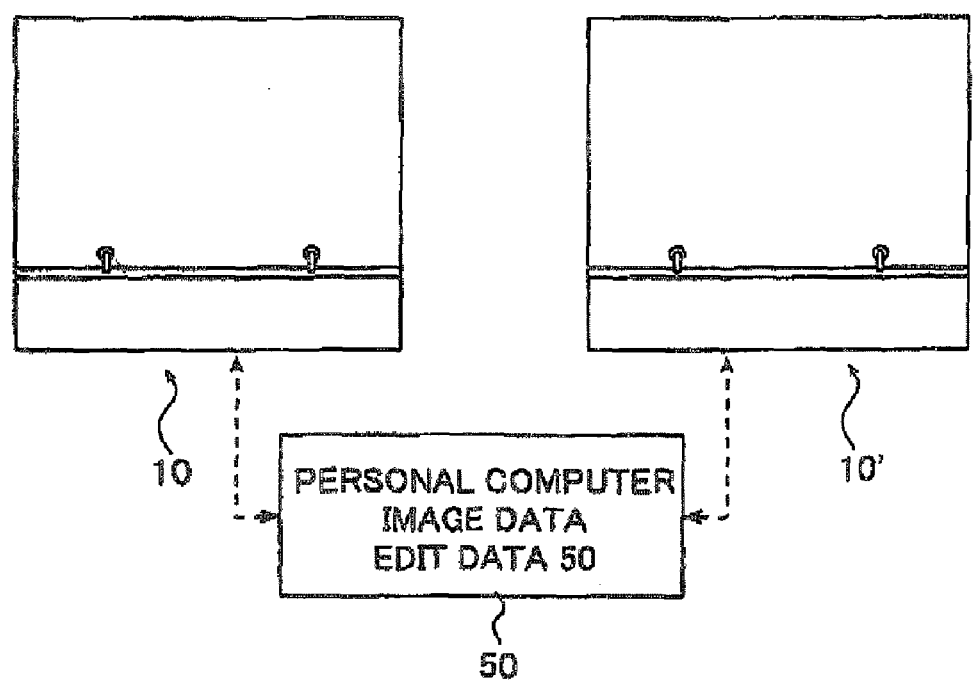

Also, the communication connecting section 35 is communicably connected to the personal computer 50 through a communication cable or a radio such as infrared rays as shown in FIG. 10(b), and can transmit the image data and the edit data to the personal computer 50 or can receive the image data and the edit data from the personal computer 50. For example, software having a function whose performance is equivalent to or higher than a processing of the image adjusting section 34 is executed within the personal computer 50 to conduct image processing high in precision on the image data in advance, and the image display mode can be edited, and thereafter the image data and the edit data can be transmitted to the electronic album 10, and the image display can be conducted in a desired image display mode by the electronic album 10. In this case, the image data and the edit data may be recorded and retained in the personal computer 50 so as to be managed. It is needless to say that the image data and the edit data can be transferred to the electronic album 10' from the electronic album 10 through the personal computer 50 by connecting the electronic album 10' to the personal computer 50. In this case, the edit data for the electronic album 10' is transferred.

Also, the image data supply section 14 may include a voice input unit which can input the voice data annexed to the image data, or annexed to the image display mode of the respective pages of the electronic paper P, for example, a microphone and a voice data conversion board that produces voice data, and a voice output unit, for example, a conversion board that converts the voice data into a voice signal and a speaker. In the case where the voice data is annexed to the respective pages displayed in accordance with the image data and the image display mode, the page to which the voice data is annexed and the page on which the image is displayed annexed to the voice data is opened, the voice data is reproduced after a given set period of time (voice output start time), and the voice is outputted. The judgment of whether the page is opened, or not, is made by a page angle detection sensor formed of a photoelectric sensor disposed in the image data supply section 14. The voice input unit and the voice output unit may be built in the image display section 12.

In the voice output, "voice output" and "voice output start time" may be written in the edit data by the above-mentioned input touch pen 16. Also, in the case where there is the image data or the voice data annexed to the image, "voice output" may be set by the input touch pen 16 or set in advance so as to automatically output the voice.

Also, the image data supply section 14 includes the above-mentioned micro photographing camera, and a location environment judging section that obtains location environments from the photographed image, for example, lightness information such as light or dark, or illuminating light characteristic information such as reddish or greenish, and may adjust the display output of the display image in accordance with the judgment result judged by the location environment judging section. For example, in the case where an appreciation place is dark when appreciating the electronic album 10, the lightness and contrast of the image is increased, and in the case where the illuminating light is colored, adjustment is made so that the image is colored so as to cancel the color of the illuminating light. This image adjustment is made by, for example, a gray balance adjustment using an LUT (lookup table), a gradation correction, a density (brightness) adjustment, a photograph light source species correction due to a matrix (MTX), or an image saturation adjustment (color adjustment) in the image processing section 32 of the image data supply section 14.

The electronic album 10 is structured as described above.

Subsequently, a image display method according to the present invention will be described on the basis of the above-described electronic album 10.

First, the film cartridge C is loaded into the cartridge loading section 36 and scanning is conducted by the scanner section 26. In scanning, the film F of a cartridge C loaded in the cartridge loading section 36 disposed in the image data supply section 14 is sent out by rotating a spool rotating shaft 26b, and a transmission light obtained by transmitting a projected light toward the conveyed film F from a light source section 26h having a reflector 26e, a diffusion plate 26f and a light source 26g in a conveying path along which the film F is conveyed toward a film receiving section 26d by a pair of guide rollers 26a and a pair of film feed rollers 26c which are connected to a film feed motor are then reads by an image read section 26i. The read data is transmitted as image data to the memory/information retrieving section 30 through an amplifier not shown, an A/C converter and a data processing section.

In this situation, the film/image information such as information related to the cartridge No., the photographing information and whether or not the image display mode is adjusted, which is recorded on the transparent magnetic recording layer of the film F is read by the magnetic head 26j, and the obtained information is transmitted to the memory/information retrieving section 30.

The image data transmitted to the memory/information retrieving section 30 and the film/image information read by the magnetic head 26j are recorded and retained in the memory/information retrieving section 30, and information related to whether the image display mode has been adjusted, or not is searched from the information read by the magnetic head 26j, and if it is judged that the image display mode has been adjusted, the edit data within the memory of the memory/information retrieving section 30 which is saved and managed by the cartridge No., is retrieved and called, In the case where no edit data is detected, or in the case where it is judged that no image display mode has been conducted in the past, the default edit data is called. The edit data or default edit data which is detected is transmitted to the image adjusting section 34 together with the film/image information.

On the other hand, the image data is transmitted to the image processing section 32, and the above-described various image processing is conducted, and the processed image data is transmitted to the image display adjusting section 34.

In the image display adjusting section 34, the image data is edited in accordance with the transmitted edit data or default edit data, and an image display of the image display mode based on the edit data is conducted on the respective pages of a plurality of electronic papers P of the image display section 12.

In the image display mode where image is displayed by the default edit data, as shown in FIG. 4, images are displayed in a state where a plurality of images are arranged on an electronic paper $P_2$ of a right page of opened pages longitudinally and laterally in a regular manner with a given size, and the image designated by designating a position within a display image by using the input touch pen 16 is displayed on the electronic paper $P_1$ of the left page.

In the case where the image display mode based on the default edit data is going to be edited and adjusted, the edit data is designated by the input touch pen 16, and the thumb nail image displayed on the electronic paper $P_3$ shown in FIG. 5 is designated by using the input touch pen 16, and "copy" is selected from the processing work designation items not shown, and the image can be arranged by designating a desired position of the electronic paper $P_4$.

As the processing work items by the input touch pen 16, there can be designated, in addition to the normal processing such as "enlargement/reduction", "outer frame configuration", "write", "rotation" and "inversion", "moving display" that moves the image in a moving image manner, "three-dimensional view display", "plural image display" that changes the arrangement direction of the same image in accordance with a person who views the image, "category display", and so on as the special processing.

Also, in the case where the edit data is detected with reference to the cartridge No., from the memory of the memory/information retrieving section 30, the detected edit data is used, and the image display mode displayed in the past is reproduced as it is.

In the case where the edit data is adjusted and edited, the edit data is transmitted to the memory/information retrieving section 30, and the edit data is recorded and retained in the memory on the basis of the cartridge No.

Also, the image data and edit data read by the scanner section 26 and displayed on the electronic album 10 is transmitted to the recording medium read/write section 28, and may be recorded and saved in the inserted card type recording medium K as a novel image data and edit data.

On the other hand, in the case where the image data and the edit data annexed to the image data are read from the card type recording medium K by using the recording medium read/write section 28, the image data and the edit data are transmitted to the memory/information retrieving section 30. In the case where the edit data annexed to the image data is not read, only the image data is transmitted to the memory/information retrieving section 30.

In the memory/information retrieving section 30, in the case where there is no edit data annexed to the image data the default edit data is called, and the default edit data is transmitted to the image display adjusting section 34 together with the image data. In the case where there is the edit data annexed to the image data, the edit data and the image data are transmitted to the image display adjusting section 34 together.

In the image display adjusting section 34, the same processing as that in the case where the image data is read from the scanner section 26 is conducted, and the image display mode based on the edit data or the default edit data is conducted on the image display section 12.

In this embodiment, the image display mode is edited and adjusted in the electronic album 10, but as shown in FIG. 10(a), the electronic album 10 may be connected to another electronic album 10' and receive the edit data from the electronic album 10' or the transfer of the image data if occasion demands so as to set the image display mode. Alternatively, as shown in FIG. 10(b), the electronic album 10 may be connected to the computer 50 and receive the edit data related to the image display mode set within the computer 50 or the edit data related to the image display mode recorded and saved within the computer 50 from the computer 50 as occasion demands, to display the image on the image display section 12 by using the received edit data.

The above description is given in detail of the image processing device and the image processing method in accordance with the present invention with reference to various embodiments, but the present invention is not limited to the above embodiments, but the present invention is variously improved or modified within a scope of the subject matter of the present invention.

As was described above, according to the present invention, since there is provided an image display section having a plurality of substantially sheet-like image display mediums bundled and integrated, and the image is displayed in accordance with a predetermined image display mode, the display image can be appreciated comfortably, with ease and without reducing the image size unlike the conventional paper album.

Also, since the image display mode can be edited in accordance with the user's preference, the electronic album rich in pleasure can be provided.

What is claimed is:

1. An image display apparatus, comprising:
an image data acquiring section for acquiring image data;
an image display section having a plurality of substantially sheet-like image display mediums bundled and integrated for displaying images by using said image data obtained by said image data acquiring section;
an image display mode setting device for setting an image display mode in displaying an image on an image display screen of each of the plurality of image display mediums of said image display section; and
an image display adjusting section for adjusting a display image according to the image display mode set by said image display mode setting device;
a camera for photographing a person using said image display apparatus; and
a direction confirming section for conducting a principal subject extracting operation on a photographed image of said person to confirm a direction of a person view of said person using said image display apparatus,
wherein said image display mode setting device includes a transparent input element provided on the respective image display screen of at least one image display medium of the plurality of image display mediums, and said image display mode setting device sets said image display mode under employment of the transparent input element, and said image display adjusting section adjusts an image displaying direction in accordance with said confirmed direction of the person view of said person by said direction confirming section.

2. The image display apparatus according to claim 1, wherein said image display mode setting device sets said image display mode by conducting at least one of:
   a designation of the image display screen for image display of one image display medium from the plurality of said image display mediums,
   a designation of an image display position on the designated image display screen,
   a designation of a size of the display image,
   a designation of a direction of arranging the display image,
   a designation of a process of inverting the display image,
   a designation of a configuration of an outer frame of the display image,
   a designation of displaying a template image,
   a designation of compositing the template image with the display image, and
   a designation of inputting a write comment.

3. The image display apparatus according to claim 1, wherein said image display adjusting section arranges and adjusts a plurality of images onto the plurality of said image display mediums according to page category information assigned to the plurality of said image display mediums.

4. The image display apparatus according to claim 3, wherein the page category information is at least one of a person, a meeting, a photographing date, an excursion and a flower.

5. The image display apparatus according to claim 1, further comprising a data communication device that communicates with an external device or via a communication network so as to transmit said image data.

6. The image display apparatus according to claim 1, further comprising:
   a memory for storing said image data or voice data annexed to the image display screen of at least one image display medium of the plurality of image display mediums; and
   an image input unit for inputting said image data or said voice data annexed to the respective image display screen, or a voice output unit for reproducing and outputting the voice data when having in said memory said image data or said voice data annexed to the respective image display screen.

7. The image display apparatus according to claim 1, wherein the plurality of image display mediums displays comprise at least a first image display medium and a second image display medium,
   wherein an image display screen of said first image display medium displays a first image,
   wherein an image display screen of said second image display medium displays a second image, and
   wherein said first image as displayed by said first image display medium and said second image as displayed by said second image display medium are different.

8. The image display apparatus according to claim 1, wherein only one surface side of each image display medium of the plurality of image display mediums has an image display screen for displaying an image.

9. The image display apparatus according to claim 1, wherein when image data acquired by said image data acquiring section corresponding an image is written to an image display medium of the plurality of image display mediums, an image display screen of said image display medium displays said image.

10. The image display apparatus according to claim 1, wherein the image for which said image display mode setting device sets the image display mode in displaying the respective image on a respective image display screen is an image displayed by using said image data obtained by said image data acquiring section.

11. The image display apparatus according to claim 1, wherein said plurality of substantially sheet-like image display mediums comprise a plurality of electronic papers.

12. The image display apparatus according to claim 11, wherein each electronic paper comprises:
   a plurality of spheres, each sphere having one half of a first color and a second half of a second color, said first color and said second color being different; and
   two sheets having a gap there between in which the spheres are provided,
   wherein when an electric field is applied to the spheres, the spheres are rotated and fixed.

13. The image display apparatus according to claim 11, wherein each electronic paper comprises:
   a sheet-shaped liquid crystal film.

14. The image display apparatus according to claim 13, wherein each electronic paper is a reflection-type image display medium configured to reflect external light, and the liquid crystal is a ferroelectric liquid crystal.

15. The image display apparatus according to claim 13, wherein each electronic paper is a transmission-type image display medium.

16. The image display apparatus according to claim 1, wherein the image display section is arranged as pages in a book, each page comprising at least a substantially sheet-like image display medium of said plurality of substantially sheet-like image display mediums, wherein each page has a first edge bundled together with other pages of the book, and has a second edge physically separated from the other pages of the book, wherein the first and second edges are opposite edges of each page.

17. The image display apparatus according to claim 1, wherein the transparent input element comprises a transparent pressure sensitive sheet.

18. The image display apparatus according to claim 1, wherein the image data acquiring section is detachably connected to the image display section.

19. The image display apparatus according to claim 1, wherein the image data acquiring section comprises a scanner.

20. An image display apparatus, comprising:
   an image data acquiring section for acquiring image data;
   an image display section having a plurality of substantially sheet-like image display mediums bundled and integrated for displaying images by using said image data obtained by said image data acquiring section;
   an image display mode setting device for setting an image display mode in displaying an image on an image display screen of each of the plurality of image display mediums of said image display section;
   an image display adjusting section for adjusting a display image according to the image display mode set by said image display mode setting device;
   a camera for photographing a person using said image display apparatus; and a direction confirming section for conducting a principal subject extracting operation on a photographed image of said person to confirm a direction of a person view of said person using said image display apparatus,
wherein said image display adjusting section adjusts a display output of the display image according to ambient conditions at a location of the image display apparatus, and
said image display adjusting sections adjusts an image displaying direction in accordance with said confirmed direction of the person view of said person by said direction confirming section.

21. The image display apparatus according to claim 20, wherein
said camera captures the ambient conditions.

22. The image display apparatus according to claim 20, wherein the ambient conditions comprise an illumination level of the location and an illumination color of the location.

23. The image display apparatus according to claim 20, wherein the image display adjusting section adjusts at least one of a brightness and a contrast of the display image based on the illumination level of the location.

24. The image display apparatus according to claim 20, wherein the image display adjusting section adjusts a color of the display image based on the illumination color of the location.

25. The image display apparatus according to claim 20, wherein said image display adjusting section automatically adjusts a display output of the display image according to ambient conditions at a location of the image display apparatus.

26. An image display apparatus, comprising:
an image data acquiring section for acquiring image data;
an image display section having a plurality of substantially sheet-like image display mediums bundled and integrated for displaying images by using said image data obtained by said image data acquiring section;
an image display mode setting device for setting an image display mode in displaying an image on an image display screen of each of the plurality of image display mediums of said image display section;
an image display adjusting section for adjusting a display image according to the image display mode set by said image display mode setting device; and
a lens sheet provided on the image display screen of an image display medium of the plurality of image display mediums;
a camera for photographing a person using said image display apparatus; and
a direction confirming section for conducting a principal subject extracting operation on a photographed image of said person to confirm a direction of a person view of said person using said image display apparatus,
wherein said image display adjusting section adjusts an image displaying direction in accordance with said confirmed direction of the person view of said person by said direction confirming section.

27. The image display apparatus according to claim 26, wherein said lens sheet is a lenticular lens sheet or a compound eye lens sheet.

28. The image display apparatus according to claim 26, wherein the lens sheet is configured to provide a three-dimensional view display.

29. An image display method, comprising steps of:
bundling and integrating a plurality of substantially sheet-like image display mediums for displaying images by using image data;
setting an image display mode indicative of a display mode of an image on each of said image display mediums;
providing a transparent input element on a respective image display screen of at least one image display medium of the plurality of image display mediums; and
using said transparent input element to set said image display mode;
photographing a person using said image display apparatus;
conducting a principal subject extracting operation on a photographed image of said person to confirm a direction of a person view of said person using said image display apparatus; and
adjusting an image displaying direction in accordance with said confirmed direction of the person view of said person using said image display apparatus.

30. The image display method according to claim 29, wherein said image display mode is set by conducting at least one of:
a designation of the image display screen for image display of one image display medium from the plurality of said image display mediums,
a designation of an image display position on the designated image display screen,
a designation of a size of the display image,
a designation of a direction of arranging the display image,
a designation of a process of inverting the display image,
a designation of a configuration of an outer frame of the display image,
a designation of displaying a template image,
a designation of compositing the template image and
a designation of inputting a written comment.

31. The image display method according to claim 29, wherein said image display mode is set by arranging and adjusting a plurality of images onto the plurality of said image display mediums according to page category information assigned to the plurality of said image display mediums.

32. The image display apparatus according to claim 31, wherein the page category information is at least one of a person, a meeting, a photographing date, an excursion and a flower.

33. The image display method according to claim 29, wherein the image displayed on a respective image display medium for which a display mode is set in said step of setting an image display mode is an image displayed by using said image data.

34. The image display method according to claim 29, further comprising steps of:
writing image data to an image display medium of the plurality of image display mediums, and
displaying an image by said image display medium, the displayed image corresponding to the written image data.

35. The image display method according to claim 34, further comprising a step of:
erasing said image displayed by said image display medium.

36. The image display method according to claim 34, wherein the plurality of substantially sheet-like image display mediums comprise a plurality of electronic papers, each electronic paper comprises:
a plurality of spheres, each sphere having one half of a first color and a second half of a second color, said first color and said second color being different; and
two sheets having a gap there between in which the spheres are provided, wherein when an electric field is applied to the spheres, the spheres are rotated and fixed, and wherein the step of displaying an image by the image display medium comprises applying an electric field to the spheres.

37. The image display method according to claim 29, wherein the transparent input element comprises a transparent pressure sensitive sheet.

38. An image display apparatus, comprising:
an image data acquiring section for acquiring image data;
an image display section having a plurality of substantially sheet-like image display mediums bundled and integrated for displaying images by using said image data obtained by said image data acquiring section;
an image display mode setting device for setting an image display mode in displaying an image on an image display screen of each of the plurality of image display mediums of said image display section; and
an image display adjusting section for adjusting a display image according to the image display mode set by said image display mode setting device;
a camera for photographing a person using said image display apparatus; and
a direction confirming section for conducting a principal subject extracting operation on a photographed image of said person to confirm a direction of a person view of said person using said image display apparatus, wherein each of two surface sides of each image display medium of the plurality of image display mediums displays has an image display screen for displaying an image, wherein a first surface side of said two surface sides has a first image display screen for displaying a first image, and wherein a second surface side of said two surface sides has a second image display screen for displaying a second image, and
said image display adjusting section adjusts an image displaying direction in accordance with said confirmed direction of the person view of said person by said direction confirming section.

39. The image display apparatus according to claim 38, wherein said first image display screen displays said first image, and said second image display screen displays said second image, and
wherein said first image as displayed on said first image display screen and said second image as displayed on said second image display screen are different.

* * * * *